United States Patent
Yi et al.

(10) Patent No.: US 9,041,986 B2
(45) Date of Patent: May 26, 2015

(54) SHEETFED FILM SCANNING CORRECTION METHOD

(75) Inventors: Yong-Xiang Yi, Suzhou (CN); Shan-Shan Tang, Suzhou (CN)

(73) Assignee: QISDA (SUZHOU) Co., LTD, Suzhou, Jiangsu Province (CN)

( * ) Notice: Subject to any disclaimer, the term of this patent is extended or adjusted under 35 U.S.C. 154(b) by 1124 days.

(21) Appl. No.: 12/874,216

(22) Filed: Sep. 1, 2010

(65) Prior Publication Data

US 2011/0063695 A1    Mar. 17, 2011

(30) Foreign Application Priority Data

Sep. 12, 2009   (CN) .......................... 2009 1 0176304

(51) Int. Cl.
*H04N 1/04* (2006.01)
*H04N 1/40* (2006.01)
*H04N 1/00* (2006.01)

(52) U.S. Cl.
CPC ....... *H04N 1/40056* (2013.01); *H04N 1/00249* (2013.01); *H04N 1/00267* (2013.01); *H04N 2201/0404* (2013.01)

(58) Field of Classification Search
CPC . H04N 1/193; H04N 1/17; H04N 2201/0404; H04N 2201/0411; H04N 2201/0402; H04N 1/00249; H04N 9/11; H04N 1/40056; H04N 1/1017; H04N 1/02815; H04N 2201/02868; H04N 1/1013; H04N 1/484; H04N 1/12; G03B 27/735

USPC .......... 358/487, 486, 475, 474, 509, 506, 505
See application file for complete search history.

(56) References Cited

U.S. PATENT DOCUMENTS

| | | | |
|---|---|---|---|
| 5,327,259 A * | 7/1994 | Furusawa | 358/448 |
| 6,249,362 B1 * | 6/2001 | Sato et al. | 358/527 |
| 6,486,980 B1 * | 11/2002 | Sawanobori | 358/487 |
| 6,493,061 B1 * | 12/2002 | Arita et al. | 355/41 |

FOREIGN PATENT DOCUMENTS

| | | |
|---|---|---|
| CN | 1204123 A | 1/1999 |
| CN | 1392432 A | 1/2003 |
| CN | 1432960 A | 7/2003 |
| JP | 2003270729 A | 9/2003 |
| TW | 374281 | 11/1999 |

OTHER PUBLICATIONS

Office Action of counterpart application by the State Intellectual Property Office of the People's Republic of China cited on Sep. 20, 2010.

* cited by examiner

*Primary Examiner* — Cheukfan Lee

(57) ABSTRACT

A sheetfed film scanning correction method includes: using a film holding member as a film feeding carrier, wherein the film holding member is fixed and does not move during film feeding, and wherein after the film holding member is inserted into a work position in a scanner, a scanning module of the scanner collects a first correction information under a filmless scanning state and corrects a subsequent scan result according to the first correction information; and setting sheet-feeding rollers of the scanner in idle running as if under a real film scanning state during or prior to collection of the first correction information.

8 Claims, 6 Drawing Sheets

SHEETFED FILM SCANNING CORRECTION METHOD

This application claims the benefit of People's Republic of China application Serial No. 200910176304.2, filed Sep. 12, 2009, the subject matter of which is incorporated herein by reference.

TECHNICAL FIELD

The invention relates in general to a film scanning technology, and more particularly to a scanning correction method for a sheetfed film scanning.

BACKGROUND

In general, the film scanning device has a planar light source disposed on one side of a film. During the process of scanning a film (such as a negative or a transparent document), light emitted by the planar light source disposed on one side of the film passes through the film and is received by the scanning device, to obtain an image information of the film. Before scanning, the film scanning device needs to be corrected for eliminating errors in image information caused by non-uniform, planar light source.

According to the generally known correction method, the planar light source is divided into a scan region for emitting light onto the film and a correction region for emitting light for correction. During correction, the optical image sensor of the scanning device is moved to the correction region, reads a backlight distribution information obtained from the correction region as a correction signal, and corrects the signal obtained during film scanning according to the correction signal. The above prior method is directed to correcting the planar light source which has a larger volume, but is not applicable to the portable scanner, particularly sheetfed scanning device which uses a compact and small-sized line light source as a light source during film scanning. When the above method is adapted in the portable scanner, the correction result is poor, and the scan effect is negatively affected.

BRIEF SUMMARY

Examples of the invention are directed to sheetfed film scanning correction methods. Through simulating film scanning state, the backlight distribution information under the filmless state is collected in real time and further used as a correction information, hence implementing collection of the most truthful scan correction information particularly applicable to the portable sheetfed film scanner, and eliminating impacts on the correction information caused by temperature change or physical vibration.

Embodiments of the invention are disclosed as following.

A sheetfed film scanning correction method includes: using a film holding member as a film feeding carrier, wherein after the film holding member is inserted into a work position in a scanner, a scanning module of the scanner collects a first correction information under a filmless scanning state, and corrects a subsequent scan result according to the first correction information; and setting sheet-feeding rollers of the scanner in idle running as if under a real film scanning state during or prior to collection of the first correction information.

Specifically, in the scanning correction method, the first correction information collected by the scanner during scanning is a backlight distribution information.

The scanning correction method further includes: after collecting the first correction information, scanning the fed-in film by the scanning module; and after film scanning is finished, collecting a second correction information under the filmless scanning state by scanning again, and correcting the subsequent scan result according to the second correction information.

The scanning correction method further includes: providing a portable scanner with a sensor or an activating mechanism, wherein the portable scanner senses the film holding member inserted into the work position and senses a film state through the sensor or the activating mechanism; and after finishing scanning, collecting a background information according to the result of sensing under the filmless state with the existence of the film holding member, collecting a second correction information, and correcting the subsequent scan result according to the second correction information.

A sheetfed film scanning correction method includes: scanning a fed-in film by a scanning module of a scanner with the existence of a film holding member; after finishing film scanning, collecting a third correction information, by the scanning module of the scanner, under a filmless state with existence of the film holding member; and correcting a scan result according to the third correction information, wherein the third correction information is a backlight distribution information.

The sheetfed film scanning correction method further includes: idly running sheet-feeding rollers of the scanner as if under a real film scanning state when the scanning module collects the third correction information under the filmless state with the existence of the film holding member.

The third correction information is collected before, during or after processing and storing of a scanning image information.

The sheetfed film scanning correction method further includes: providing a portable scanner with a sensor or an activating mechanism, wherein the portable scanner senses the film holding member inserted into a work position and senses a film state through the sensor or the activating mechanism; after finishing film scanning, collecting the third correction information according to the result of sensing under the filmless state with the existence of the film holding member; and correcting the scan result according to the third correction information.

A sheetfed film scanning correction method includes: scanning to collect a first correction information under a filmless state with a existence of a film holding member by a scanning module of a scanner, wherein the scanner sets a predetermined standby time; after the scanner collects the first correction information, if the standby time exceeds the predetermined standby time, scanning again to collect a fourth correction information under the filmless state with the existence of the film holding member and correcting a scan result according to the fourth correction information; and after the scanner collects the first correction information, if the standby time does not exceed the predetermined standby time, correcting the scan result according to the first correction information.

After the scanner collects the fourth correction information, if the standby time exceeds the predetermined standby time, the scanner scans again to collect a fifth correction information under the filmless state with the existence of the film holding member until the standby time after the scanner collects a new correction information does not exceed the predetermined standby time, and the last collected correction information is used as a final correction information for the scan result.

The sheetfed film scanning correction method further includes: providing a portable scanner with a sensor or an activating mechanism, wherein the portable scanner senses the film holding member inserted into a work position and senses a film state through the sensor or the activating mechanism; after finishing film scanning, collecting a background information under the filmless state with the existence of the film holding member according to a sensing result; after the scanner collects the first correction information, if the standby time exceeds the predetermined standby time, scanning again to collect the fifth correction information under the filmless state with the existence of the film holding member; and correcting the scan result according to the fifth correction information, wherein the fifth correction information is a backlight distribution information.

A sheetfed film scanning correction method includes: during scanning a plurality of film sets and before each film set is scanned, collecting a correction information by a scanning module of a scanner under a filmless state with an existence of the film holding member; and correcting a scan result according to the respective correction information, wherein the correction information is a backlight distribution information.

A large number of experiments regarding factors affecting scanning of the portable scanner are conducted by the inventors, and the results of experiments show that when the sheetfed scanner scans a film by way of line scanning, the backlight distribution information under the filmless state has a larger variance due to the temperature, the vibration and the operation state of the peripheral equipment. However, the backlight distribution information is less affected by the backlight source. Thus, an ideal correction result will not be achieved by simply collecting the background information under the condition after the scanner is booted and using the collected background information as a correction information. Meanwhile, the film holding member inserted into the portable scanner also affects the backlight distribution of the backlight source.

The inventor ascribes that variances in the respective backlight distribution information under the filmless state and under the real film scanning state are due to the change in temperatures of elements of the scanner, the vibration and the movements caused by elements of the scanner. Since the volume of the scanner is small and the elements and the photo-electrical scanning element are compactly installed, the environmental and factorial change caused by temperature rise during scanning, tiny vibration caused by an external force and rotation of the sheet-feeding rollers all affect the backlight distribution information in both the filmless state and the film scanning state.

Based on the factor analysis of the scan data, by simulating film scanning, the sheetfed film scanning correction method collects the backlight distribution information under the filmless state with the existence of the film holding member and uses the backlight distribution information as a correction information, hence effectively eliminating various unfavorable factors, occurring if the correction information is incorrect, on the scan data. During the collection of the correction information, the correction method could further collect the correction information under various states; and according to different scan conditions, the correction information collected in a simulation environment closest to the real environment is used as a correction information for scanning for accurately and reasonably correcting the scan result.

When scanning is finished, the correction method could immediately scan to collect a backlight distribution information under a filmless simulation scanning, so as to further match the conditions of temperature and physical vibration in scanning a film, hence eliminating impacts on the correction information caused by the above factorial change and implementing an optimum correction on scanning.

The sheetfed film scanner could be in standby state for a long time or scan films intermittently. The correction method could further collect the correction information after a predetermined time interval so as to collect the backlight distribution information close to a real film scanning state, for reasonably correcting the scan result.

The sheetfed film scanning correction method of examples of the invention has the following advantages. By film scanning simulation, the backlight distribution information under the filmless state is real-time collected and used as a correction information, hence implementing the collection of most accurate scan correction information as if under a real scanning environment, particularly applicable to the portable sheetfed film scanner, and eliminating impacts on the correction information caused by temperature change or physical vibration.

It is to be understood that both the foregoing general description and the following detailed description are exemplary and explanatory only and are not restrictive of the disclosed embodiments, as claimed.

DETAILED DESCRIPTION OF EXEMPLARY EMBODIMENT OF THE INVENTION

Figure 1:
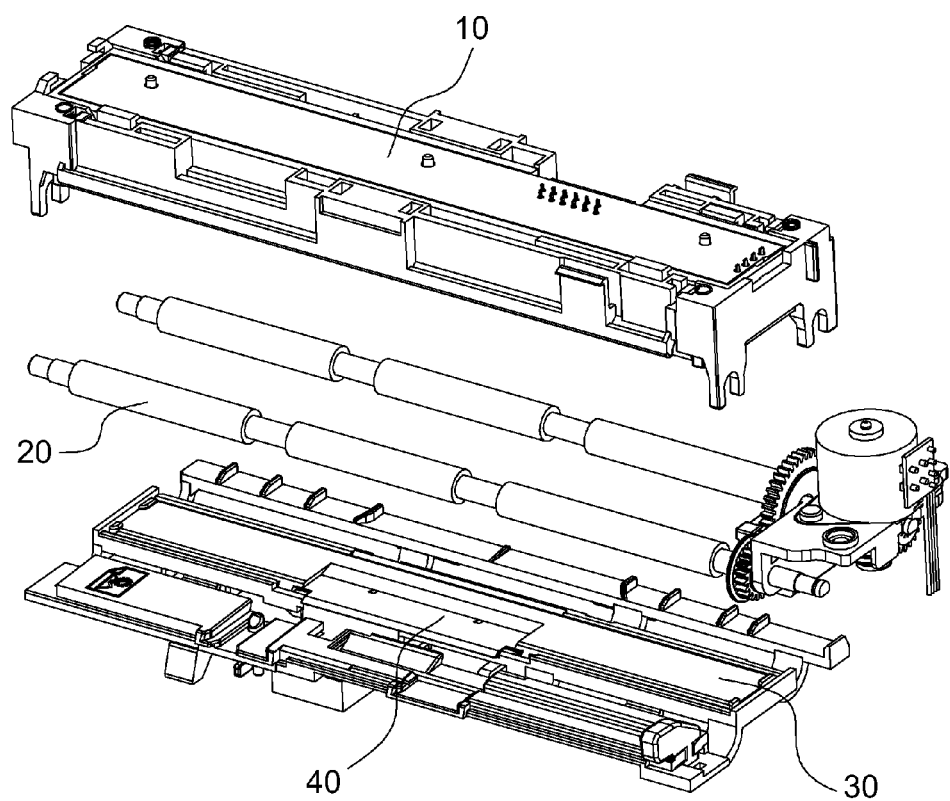
FIG. 1 shows a structural assembly diagram of a portable scanner according to a practical implementation of the invention.

The sheetfed film scanning correction methods according to examples of the invention are for a portable scanner (such as shown in FIG. 1) for correction during film scanning. Due to the existence of a backlight source and the impact of various environmental factors, the portable scanner is susceptible to influence caused by external factors and as such collects different backlight distribution information under different environmental conditions. This is why the prior scan result cannot achieve optimum effect in spite of correction. Therefore, the environment closest to the real film scanning environment is simulated so as to obtain the simulation backlight distribution information closest to the real backlight distribution information in the real film scanning state; and the simulation backlight distribution information is used as a correction information for reasonably and accurately correcting the scan result.

Figure 2:
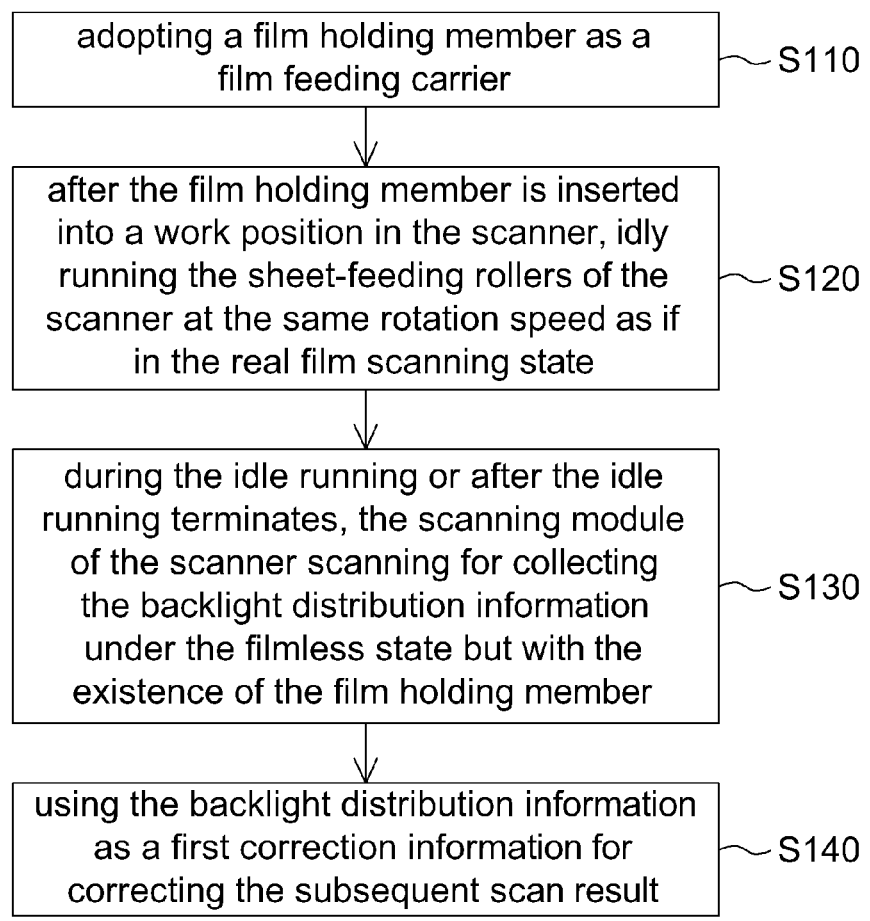
FIG. 2 shows a flow diagram according to a first embodiment of the invention.

In the first embodiment as indicated in FIG. 1 and FIG. 2, at step S110, a film holding member 40 is adopted as a film feeding carrier, wherein the film holding member 40 is an inserted film holding member which is fixed to the housing 30 and does not move during the feeding of a film. Next, at step S120, after the film holding member is inserted into a work position in the scanner, the sheet-feeding rollers 20 of the scanner is in idle running at the same rotation speed as in the real film scanning state, hence implementing the simulation of the impact of various elements on the backlight distribution information in the real film scanning state as well as implementing the reproduction of the real scan environment. Then, at step S130, during the idle running or after the idle running terminates, the scanning module 10 of the scanner starts to scan for collecting the backlight distribution information under the filmless state but with the existence of the film holding member. At step S140, the scanner uses thus obtained backlight distribution information as a first correction information. The scanner corrects the scan result according to the first correction information.

By simulating the operation of various elements of the scanning module during filmless scanning, the scanning correction method implements the reproduction of the backlight distribution information in the real film scanning state, hence eliminating impacts on the backlight distribution information caused by temperature change, vibration and the existence of the film holding member and accordingly correcting the film scanning result with high accuracy.

Figure 3:
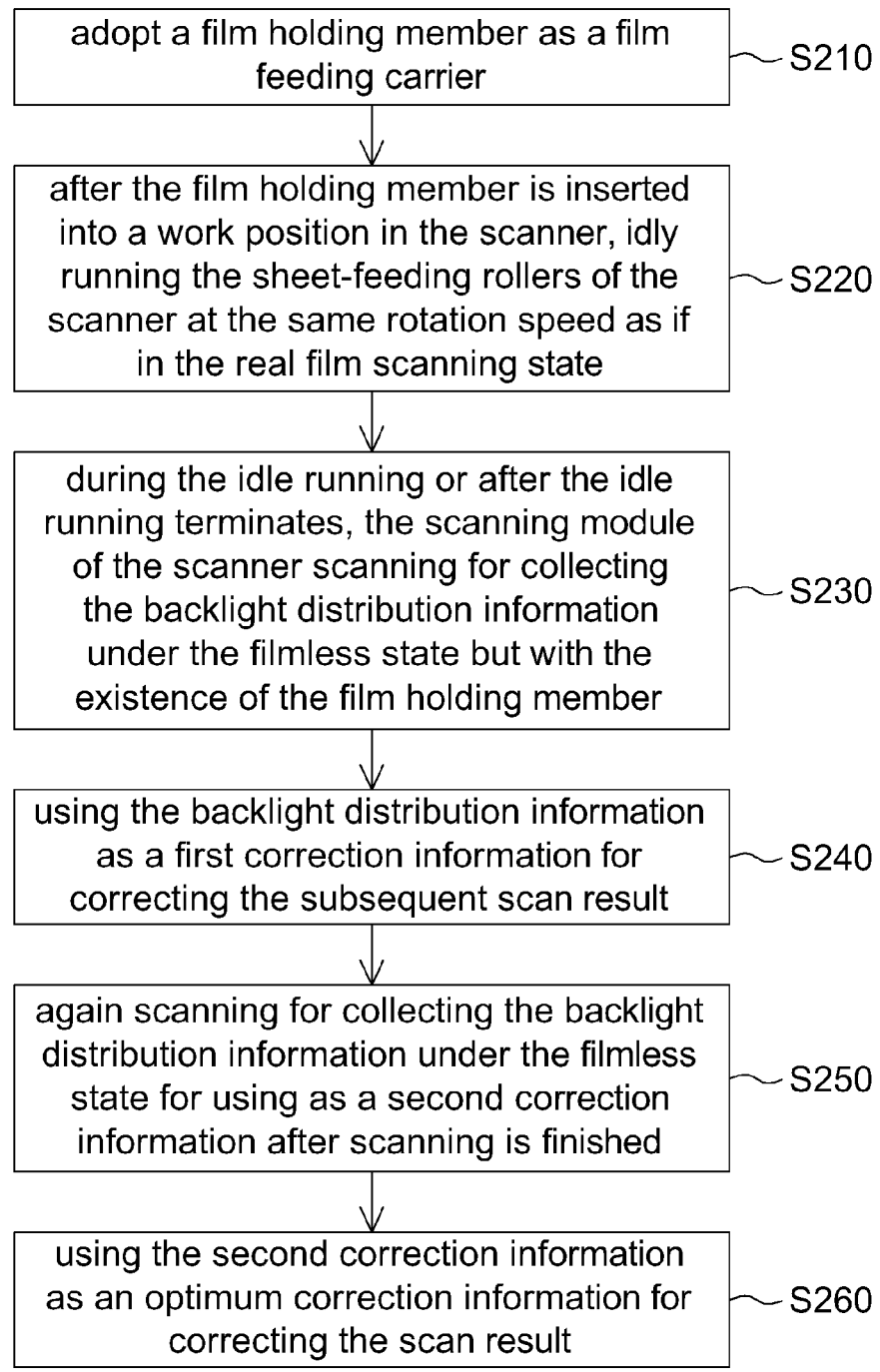
FIG. 3 shows a flow diagram according to a second embodiment of the invention.

In the second embodiment as indicated in FIG. 3, at step S210, a film holding member is adopted as a film feeding carrier. At step S220, after the film holding member is inserted into the work position in the scanner, the sheet-feeding rollers of the scanner is in idle running at the same rotation speed as in the real film scanning state. At step S230, during the idle running or after the idle running terminates, the scanning module of the scanner starts to scan for collecting the backlight distribution information under the filmless state but with the existence of the film holding member. At step S240, the scanner uses the backlight distribution information as the first correction information, and corrects the subsequent scan result according to the first correction information.

Or, the step 250 supersedes the step S240. At step 250, after the scanning module finishes scanning, the scanning module again scans to collect the backlight distribution information under the filmless state as a second correction information. During the collection of the second correction information, the states of the environment such as the scanning element temperature, the environment temperature, the element vibration environment and the state of the scanning module are close to the real film scanning environment. At step S260, the scanning device uses the second correction information as an optimum correction information for correcting the scan result so as to obtain the optimum scan image data.

Figure 4:
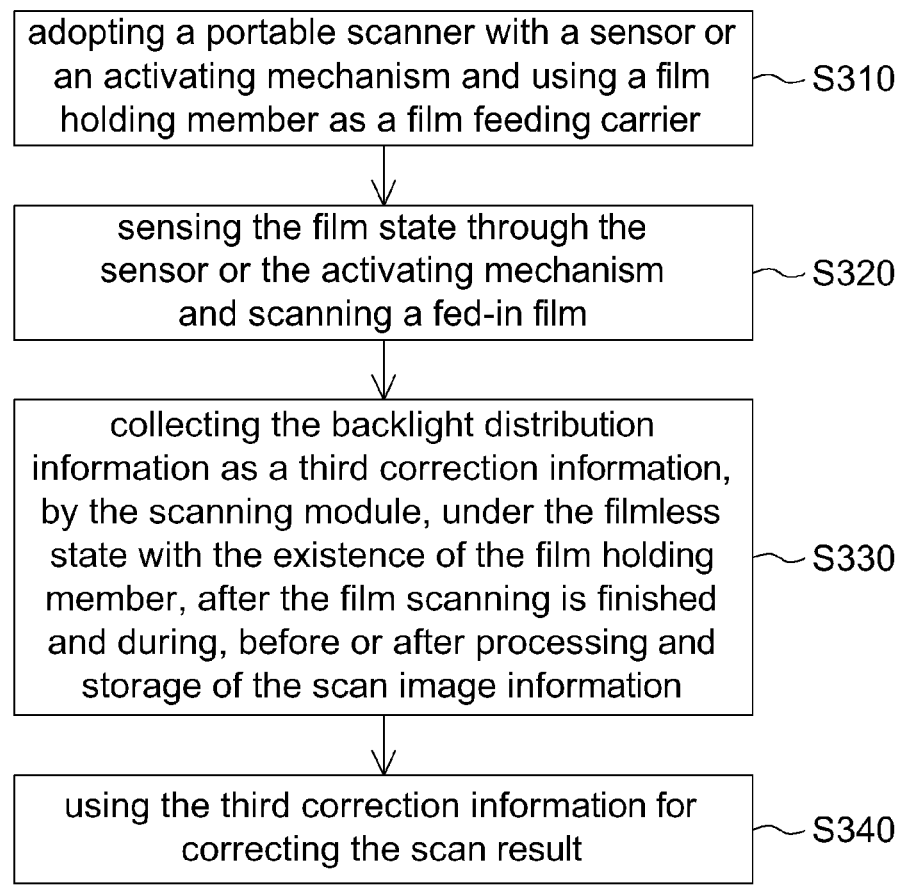
FIG. 4 shows a flow diagram according to a third embodiment of the invention.

In the third embodiment as indicated in FIG. 4, at step S310, a portable scanner with a sensor or an activating mechanism is provided; and a film holding member is used as a film feeding carrier. At step S320, the scanner senses the state of the film through the sensor or the activating mechanism and scans the fed-in film. At step S330, after scanning is finished and before, during or after process and storage of the scan image data, the scanning module collects the backlight distribution information under the filmless state but with the existence of the film holding member and uses the thus obtained backlight distribution information as a third correction information. At step S340, the third correction information is used for correcting the scan result. Since the third correction information is closer to the situation in the real film scanning state, the third correction information is close to the real backlight distribution information in the real scan state.

To further simulate the environment in collection of the correction information during film scanning, the above embodiment could drive the sheet-feeding rollers of the scanning module in idle running.

Figure 5:
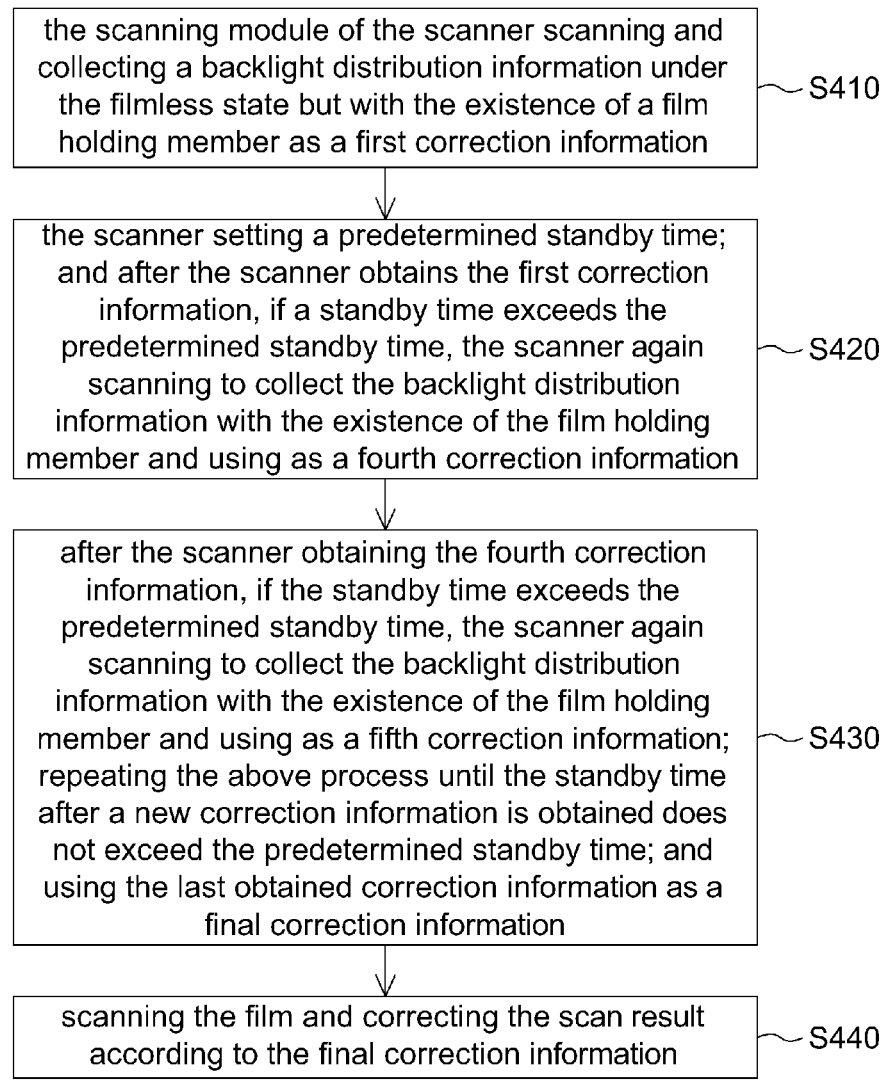
FIG. 5 shows a flow diagram according to a fourth embodiment of the invention.

In the fourth embodiment as indicated in FIG. 5, at step S410, the scanning module of the scanner scans and collects a backlight distribution information under the filmless state but with the existence of a film holding member as a first correction information. At step S420, the scanner sets a predetermined standby time; and after the scanner obtains the first correction information, if a standby time (during which the scanner is standby) exceeds the predetermined standby time, the scanner again scans to collect the backlight distribution information with the existence of the film holding member and uses the obtained backlight distribution information as a fourth correction information. At step S430, after the scanner obtains the fourth correction information, if the standby time (during which the scanner is standby) exceeds the predetermined standby time, the scanner again scans to collect the backlight distribution information with the existence of the film holding member and uses the obtained backlight distribution information as a fifth correction information; the above process is repeated until the standby time (after a new correction information is obtained) does not exceed the predetermined standby time and the last obtained correction information is used as a final correction information. At step S440, the scanner scans the film and corrects the scan result according to the final correction information.

The accuracy for correction is improved in the above embodiment through setting the predetermined standby time, activating the scanner to collect the correction information for many times, and using the final correction information for correcting the scan result.

Figure 6:
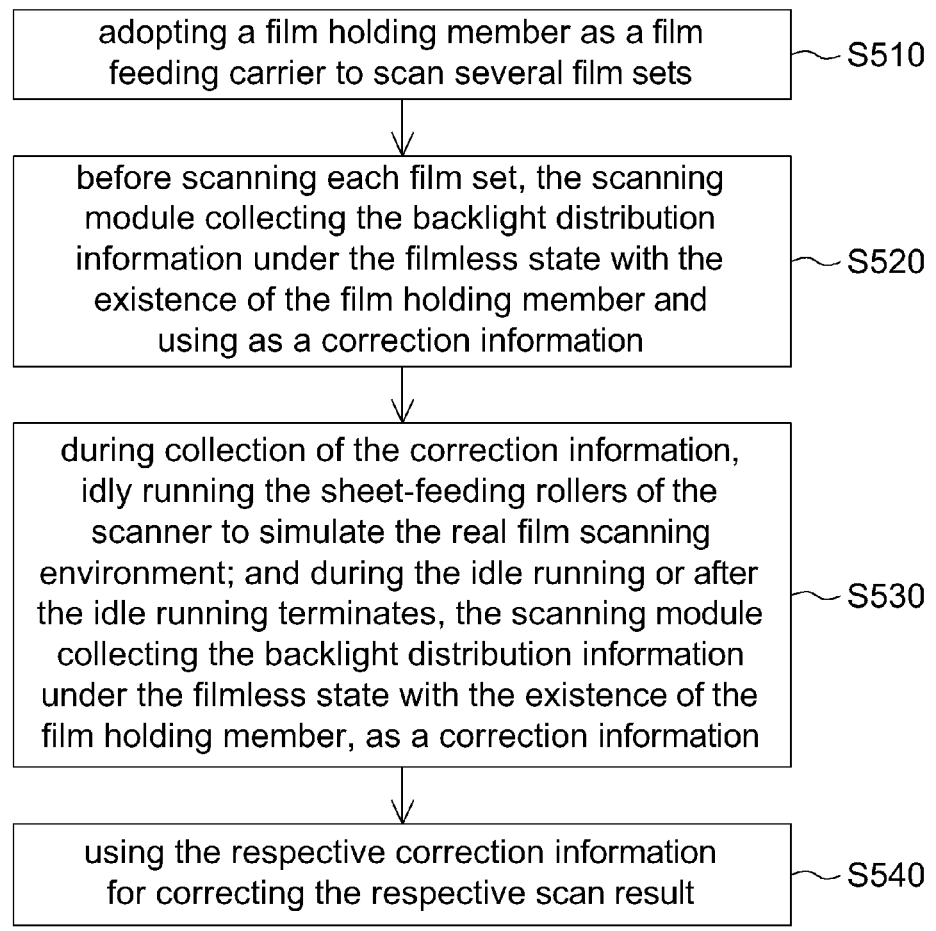
FIG. 6 shows a flow diagram according to a fifth embodiment of the invention.

In the fifth embodiment as indicated in FIG. 6, at step S510, a film holding member is adopted as a film feeding carrier, and several film sets are to be scanned. At step S520, before scanning each film set, the scanning module collects the backlight distribution information under the filmless state with the existence of the film holding member and uses the thus obtained backlight distribution information as a correction information. At step S530, during collection of the correction information, the sheet-feeding rollers of the scanner is in idle running to simulate the real film scanning environment; and during the idle running or after the idle running terminates, the scanning module collects the backlight distribution information under the filmless state with the existence of the film holding member as a correction information. At step S540, the respective correction information is used for correcting the respective scan result.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A sheetfed film scanning correction method comprises:
   using a film holding member as a film feeding carrier, wherein the film holding member is fixed and does not move during film feeding, and wherein after the film holding member is inserted into a work position in a scanner, a scanning module of the scanner collects a first correction information under a filmless scanning state, and corrects a subsequent scan result according to the first correction information; and
   setting sheet-feeding rollers of the scanner in idle running as if under a real film scanning state during or prior to collection of the first correction information.

2. The sheetfed film scanning correction method according to claim 1, wherein:

the first correction information collected by the scanner during scanning is a backlight distribution information.

3. The sheetfed film scanning correction method according to claim 1, further comprising:
   after collecting the first correction information, scanning a fed-in film by the scanning module; and
   after film scanning is finished, collecting a second correction information under the filmless scanning state by scanning again, and correcting the subsequent scan result according to the second correction information.

4. The sheetfed film scanning correction method according to claim 1, wherein the scanner is a portable scanner and the sheetfed film scanning correction method further comprising:
   providing the portable scanner with a sensor or an activating mechanism, wherein the portable scanner senses the film holding member inserted into the work position and senses a film state through the sensor or the activating mechanism; and
   after finishing scanning, collecting a background information according to the result of sensing under the filmless scanning state with the existence of the film holding member, collecting a second correction information, and correcting the subsequent scan result according to the second correction information.

5. A sheetfed film scanning correction method, comprising:
   scanning a fed-in film by a scanning module of a scanner with the existence of a film holding member wherein the film holding member is fixed and does not move during film feeding;
   after finishing film scanning, collecting a third correction information, by the scanning module of the scanner, under a filmless scanning state with the existence of the film holding member inserted into a work position in the scanner; and
   correcting a scan result according to the third correction information, wherein the third correction information is a backlight distribution information.

6. The sheetfed film scanning correction method according to claim 5, further comprising:
   idly running sheet-feeding rollers of the scanner as if under a real film scanning state when the scanning module collects the third correction information under the filmless scanning state with the existence of the film holding member.

7. The sheetfed film scanning correction method according to claim 5, wherein the third correction information is collected before, during or after processing and storing of a scanning image information.

8. The sheetfed film scanning correction method according to claim 5, wherein the scanner is a portable scanner and the step of correcting further comprises:
   providing the portable scanner with a sensor or an activating mechanism, wherein the portable scanner senses the film holding member inserted into the work position and senses a film state through the sensor or the activating mechanism;
   after finishing film scanning, collecting the third correction information according to the result of sensing under the filmless scanning state with the existence of the film holding member; and
   correcting the scan result according to the third correction information.

* * * * *